(12) United States Patent
Du et al.

(10) Patent No.: US 12,607,722 B2
(45) Date of Patent: Apr. 21, 2026

(54) OPTICAL WAVEGUIDE DEVICE USED IN LASER DETECTION AND RANGING SYSTEM

(71) Applicant: Rayz Technologies Co. Ltd., Yancheng (CN)

(72) Inventors: Detao Du, Beijing (CN); Ruxin Chen, Beijing (CN)

(73) Assignee: Rayz Technologies Co. Ltd., Yancheng (CN)

( * ) Notice: Subject to any disclaimer, the term of this patent is extended or adjusted under 35 U.S.C. 154(b) by 750 days.

(21) Appl. No.: 18/102,547

(22) Filed: Jan. 27, 2023

(65) Prior Publication Data

US 2023/0243932 A1    Aug. 3, 2023

(30) Foreign Application Priority Data

Jan. 30, 2022    (CN) .......................... 202210115043.9

(51) Int. Cl.
| | |
|---|---|
| *G01S 7/48* | (2006.01) |
| *G01S 7/481* | (2006.01) |
| *G01S 17/42* | (2006.01) |
| *G02B 5/02* | (2006.01) |

(52) U.S. Cl.
CPC ............ *G01S 7/4817* (2013.01); *G01S 17/42* (2013.01); *G02B 5/0284* (2013.01)

(58) Field of Classification Search
USPC ........................................................ 356/4.01
See application file for complete search history.

(56) References Cited

U.S. PATENT DOCUMENTS

| | | | |
|---|---|---|---|
| 2020/0064547 A1* | 2/2020 | Goodwill | ............... G02B 6/122 |
| 2021/0124170 A1* | 4/2021 | Lee | ...................... G02B 6/0016 |
| 2021/0141130 A1* | 5/2021 | Lee | .................... G02B 27/1006 |
| 2021/0278513 A1* | 9/2021 | Barber | .................. G01S 7/4917 |
| 2022/0276347 A1* | 9/2022 | Satyan | .................... G01S 7/493 |
| 2022/0334225 A1* | 10/2022 | Davydenko | ........... G02F 1/0147 |
| 2022/0350178 A1* | 11/2022 | Hsu | ........................ G02B 6/125 |
| 2025/0164641 A1* | 5/2025 | Chen | ..................... G01S 7/4817 |

FOREIGN PATENT DOCUMENTS

| | | | | |
|---|---|---|---|---|
| CN | 107924027 A | * | 4/2018 | ............... G02B 6/34 |
| CN | 214795505 U | * | 11/2021 | |
| CN | 216485897 U | * | 5/2022 | |
| JP | 2022548824 A | * | 11/2022 | ............. G01S 17/34 |

\* cited by examiner

*Primary Examiner* — James R Hulka
(74) *Attorney, Agent, or Firm* — Loeb & Loeb LLP

(57) ABSTRACT

The present disclosure provides an optical waveguide device used in a laser detection and ranging system (lidar). The optical waveguide device includes: a waveguide inlet configured to receive a first light signal; a waveguide body configured to guide the first light signal to transmit in the optical waveguide device; and a waveguide outlet configured to output a second light signal exited after the first light signal is guided; a ratio of the area of the waveguide inlet to that of the waveguide outlet is greater than a first preset ratio, and transmission efficiencies of the optical waveguide device in first and second directions are different, the transmission efficiency in the first direction is greater than a first threshold, the transmission efficiency in the second direction is less than a second threshold. With this optical waveguide device, effects of long measurement distance, high angular resolution and small volume can be achieved.

20 Claims, 10 Drawing Sheets

Emitted light signal

OPTICAL WAVEGUIDE DEVICE USED IN LASER DETECTION AND RANGING SYSTEM

CROSS-REFERENCE TO RELATED APPLICATION

This application claims priority to Chinese application 202210115043.9, filed on Jan. 30, 2022, whose disclosure is incorporated by reference in its entirety herein.

TECHNICAL FIELD

The embodiments of the present disclosure relate to an optical waveguide device used in a laser detection and ranging system.

BACKGROUND

LIDAR is a laser detection and ranging system that detects characteristic quantities such as position and speed of a target by emitting laser beams. Its working principle is sending a probing signal such as a laser beam to the target, then comparing the received signal reflected from the target with the emitted signal and performing appropriate processing to obtain relevant information such as distance, azimuth, speed, posture, shape, etc. of the target.

For example, LIDAR uses laser time-of-flight to measure distance. LIDAR emits a laser pulse to a target scene (also referred to as the space to be measured), and then receives an echo signal returned from an object in the target scene. The time difference from emitting the laser pulse by the LIDAR to receiving the echo from the target object multiplied by 0.5 times of the speed of light is the distance between the LIDAR and the object in the target scene. In order to be capable of measuring a large range of space, the laser pulse needs to be emitted into a large angular space (i.e., Field of View, FOV), and usually the scheme to achieve this purpose includes the LIDAR overall mechanical rotation, and rotating mirror, vibrating mirror, wedge mirror, micro-vibrating mirror, optical phase array (OPA), etc. are used inside the laser.

Although many LIDAR ranging schemes have been proposed, they all have some defects. For example, the LIDAR overall mechanical rotation scheme has a large volume and a short mechanical life. The scheme of using rotating mirror and wedge mirror has low spatial angular resolution of the scanning result when the rotation speed is low. High angular resolution requires high rotating speed and has high mechanical requirements. Micro-Electro-Mechanical System (MEMS) has a high rotating speed, but its available optical aperture is small, which limits the LIDAR's measurable distance. Therefore, there is an urgent need for a solution to achieve comprehensive optimization in the prior art.

SUMMARY

The present disclosure provides an optical waveguide device used in a laser detection and ranging system (lidar), which can achieve the effects of long measurement distance, high angular resolution, and small volume.

At least one embodiment of the present disclosure provides an optical waveguide device used in a laser ranging system, the optical waveguide device including: a waveguide inlet configured to receive a first light signal; a waveguide body configured to guide the first light signal to transmit in the optical waveguide device; and a waveguide outlet configured to output a second light signal exited after the first light signal is guided; wherein a ratio of the area of the waveguide inlet to that of the waveguide outlet is greater than a first preset ratio, and transmission efficiencies of the optical waveguide device in first and second directions are different, the transmission efficiency in the first direction is greater than a first threshold, and the transmission efficiency in the second direction is less than a second threshold.

As an example, in the optical waveguide device provided by an embodiment of the present disclosure, a functional surface of the waveguide body includes a diffuse reflection portion.

As an example, in the optical waveguide device provided by an embodiment of the present disclosure, at least a portion of the functional surface of the waveguide body that is close to the waveguide outlet is a diffuse reflection surface, and at least a portion of the functional surface of the waveguide body that is close to the waveguide inlet is a specular reflection surface.

As an example, in the optical waveguide device provided by an embodiment of the present disclosure, at least a portion of the functional surface of the waveguide body that is close to the waveguide inlet is a transmission surface or an absorption surface or a hollow.

As an example, in the optical waveguide device provided by an embodiment of the present disclosure, the waveguide body includes a first waveguide surface, a second waveguide surface, a third waveguide surface and a fourth waveguide surface which are close to and/or connected to each other; wherein at least one surface of the first waveguide surface, the second waveguide surface, the third waveguide surface and the fourth waveguide surface includes a first portion close to the waveguide outlet, and the first portion projects part of the first light signal propagated thereon to the waveguide outlet.

As an example, in the optical waveguide device provided by an embodiment of the present disclosure, the first waveguide surface and the second waveguide surface further include a second portion close to the waveguide inlet, and the second portion reflects part of the first light signal incident thereon to the waveguide inlet or transmits the same out of the waveguide body or absorbs the same.

As an example, in the optical waveguide device provided by an embodiment of the present disclosure, a ratio of the intensity of the second light signal to that of the first light signal is smaller than a second preset ratio.

As an example, in the optical waveguide device provided by an embodiment of the present disclosure, a ratio between the first portion and the second portion in the first waveguide surface is less than or equal to a third preset ratio, and a ratio between the first portion and the second portion in the second waveguide surface is less than or equal to the third preset ratio; a ratio between the first portion and the second portion in the third waveguide surface is less than or equal to a fourth preset ratio, and a ratio between the first portion and the second portion in the fourth waveguide surface is less than or equal to the fourth preset ratio.

As an example, in the optical waveguide device provided by an embodiment of the present disclosure, a ratio of the intensity of the second light signal to that of the first light signal is greater than a fifth preset ratio within a predetermined field of view, a ratio of the intensity of the second light signal to that of the first light signal is smaller than the fifth preset ratio outside the predetermined field of view.

At least one embodiment of the present disclosure provides a lidar system, including: at least one light source unit configured to emit an emitted light signal, and part of a reflected light signal after the emitted light signal is reflected by at least one target object in a target scene is received by the lidar system as an echo light signal, wherein the emitted light signal contains information about emission start time of the emitted light signal; at least one photoelectric conversion unit configured to convert the echo light signal into a received photoelectric signal, wherein the received photoelectric signal contains information about the time when the echo light signal is received; at least one light transmission unit configured to receive the emitted light signal and send it to the target scene, and/or to receive the echo light signal and send it to the at least one photoelectric conversion unit; and at least one signal processing unit configured to generate a scan control signal so as to control at least one scanning unit and/or obtain a scan feedback signal from the at least one scanning unit, and to determine at least one of a distance of the target object, a reflectivity of the target object, a directional angle of the target object, and a profile of the target object according to the reflected light signal, the received photoelectric signal, the scan control signal and the scan feedback control signal; wherein the at least one light transmission unit includes: the at least one scanning unit configured to change a propagation direction of the emitted light signal and/or the echo light signal; at least one receiving lens unit configured to receive the echo light signal; at least one optical waveguide unit configured to guide the echo light signal to the at least one photoelectric conversion unit, a ratio of the area of a waveguide inlet to that of a waveguide outlet in the at least one optical waveguide unit is greater than a first preset ratio, and a functional surface of the at least one optical waveguide unit includes a diffuse reflection portion; wherein the at least one photoelectric conversion unit is disposed at a corresponding waveguide outlet to receive a light signal emitted out from the waveguide outlet.

As an example, in the lidar system provided by an embodiment of the present disclosure, the at least one light transmission unit further includes: at least one prism unit configured to change the propagation direction of the emitted light signal and/or the echo light signal, so as to reduce the propagation angle of partial light signal of the emitted light signal or the echo light signal with a large propagation angle and to increase the propagation angle of partial light signal of the emitted light signal or the echo light signal with a small propagation angle; wherein the at least one prism unit is disposed between the light source unit and the optical waveguide unit.

As an example, in the lidar system provided by an embodiment of the present disclosure, the at least one light transmission unit further includes: at least one composite reflecting mirror unit configured to change the propagation direction of the emitted light signal or the echo light signal, so as to reduce the propagation angle of partial light signal with a large propagation angle of the emitted light signal or the echo light signal, and increase the propagation angle of partial light signal with a small propagation angle of the emitted light signal or the echo light signal; wherein the at least one composite reflecting mirror unit is disposed between the light source unit and the optical waveguide unit.

As an example, in the lidar system provided by an embodiment of the present disclosure, the scanning unit includes at least one of a MEMS vibrating mirror, a rotating prism, a rotating polygonal mirror, a rotating wedge mirror, an optical phased array, a photoelectric deflection device, and a liquid crystal scanning part, wherein the liquid crystal scanning part includes a liquid crystal spatial light modulator, a liquid crystal super crystal plane, a liquid crystal line-controlled array, a see-through one-dimensional liquid crystal array, a transmissive two-dimensional liquid crystal array or a liquid crystal display module.

As an example, in the lidar system provided by an embodiment of the present disclosure, the at least one light transmission unit further includes: at least one collimating lens unit configured to collimate the emitted light signal in first and second directions before the emitted light signal is reflected into the target scene.

As an example, in the lidar system provided by an embodiment of the present disclosure, the at least one collimating lens unit includes a first one-dimensional collimating lens unit and a second one-dimensional collimating lens unit, wherein the first one-dimensional collimating lens unit is disposed between the light source unit and a first scanning unit of the at least one scanning unit, and configured to collimate partial light signal of the emitted light signal in the first direction before it is incident on the first scanning unit; the second one-dimensional collimating lens unit is disposed between the first one-dimensional collimating lens unit and the target scene, and configured to reflect partial light signal of the emitted light signal in the second direction before it is reflected to the target scene.

As an example, in the lidar system provided by an embodiment of the present disclosure, the at least one collimating lens unit includes a two-dimensional collimating lens unit, wherein the two-dimensional collimating lens unit is disposed between the light source unit and the first scanning unit of the at least one scanning unit, and configured to collimate the partial light signal in the first direction and the partial light signal in the second direction of the emitted light signal before they are incident on the first scanning unit.

As an example, in the lidar system provided by an embodiment of the present disclosure, the at least one photoelectric conversion unit includes a first photoelectric conversion unit and a second photoelectric conversion unit, and the at least one optical waveguide unit includes a first optical waveguide unit and a second optical waveguide unit; the second optical waveguide unit and the second photoelectric conversion unit on one hand and the first optical waveguide unit and the first photoelectric conversion unit on the other hand are respectively disposed in different positions orientating different directions or the same direction in the lidar system.

As an example, in the lidar system provided by an embodiment of the present disclosure, the at least one light transmission unit further includes: a polygonal rotating mirror unit configured to rotate around a vertical axis of the polygonal rotating mirror unit, to reflect the emitted light signal reflected by an incident light receiving unit into the target scene, and/or to reflect the echo light signal returned from the target scene to the first optical waveguide unit and/or the second optical waveguide unit; wherein the first optical waveguide unit and the second optical waveguide unit are disposed symmetrically with respect to the polygonal rotating mirror unit; or, the first optical waveguide unit and the second optical waveguide unit are disposed staggered from each other relative to the polygonal rotating mirror unit.

As an example, in the radar system provided by an embodiment of the present disclosure, the at least one light transmission unit includes a first light transmission unit and a second light transmission unit; the first light transmission unit and the second light transmission unit receive emitted light signals from the same or different light source units.

As an example, in the lidar system provided by an embodiment of the present disclosure, the at least one light source unit includes a first light source unit and a second light source unit; the first light transmission unit receives the emitted light signal from the first light source unit, and the second light transmission unit receives the emitted light signal from the second light source unit.

As an example, in the lidar system provided by an embodiment of the present disclosure, the at least one light transmission unit further includes: at least one diaphragm unit configured to intercept the light in part of the propagation directions of the echo light signal, and each diaphragm unit of the at least one diaphragm unit is disposed between the optical waveguide unit and the target scene.

As an example, in the lidar system provided by an embodiment of the present disclosure, each optical waveguide unit of the at least one optical waveguide unit in the lidar system is the optical waveguide device of any one of the above-mentioned embodiments.

BRIEF DESCRIPTION OF DRAWINGS

So that the technical solutions of the embodiments of the present disclosure can be explained more clearly, the appended drawings of the embodiments will be briefly introduced below. Obviously, the accompanying drawings in the following description merely relate to some embodiments of the present disclosure, and are not intended to limit the present disclosure.

DETAILED DESCRIPTION

In order to make the objectives, technical solutions and advantages of the embodiments of the present disclosure more clearly, the embodiments of the present disclosure will be described explicitly and completely below with reference to the accompanying drawings. Obviously, the described embodiments are only part of the embodiments of the present disclosure, rather than all of them. Based on the described embodiments of the present disclosure, all other embodiments obtained by those skilled in the art without inventive labor belong to the scope of protection of the present disclosure.

Unless otherwise defined, technical terms or scientific terms used in the present disclosure shall have common meanings known by ordinary skilled in the art to which the present disclosure pertains. Words such as "first", "second" and the like used in the present disclosure are not intended for any sequence, quantity or priority, but only intended to distinguish different components. Also, words "a", "an", "the" and the like also are not intended for limitation of quantity but intended for presence of at least one. Words such as "comprise", "include" and the like mean that an element or object present before this word encompasses all the elements or objects or alternatives thereof listed after this word, without excluding other elements or objects. Words such as "connected", "connecting" and the like are not restricted to physical or mechanical connections, but may include electrical connections, regardless of directly or indirectly. Words such as "up", "below", "left", "right" etc., are only used to denote relative positional relationship, once an absolute position of the described object changes, the relative positional relationship may change correspondingly.

Figure 1:
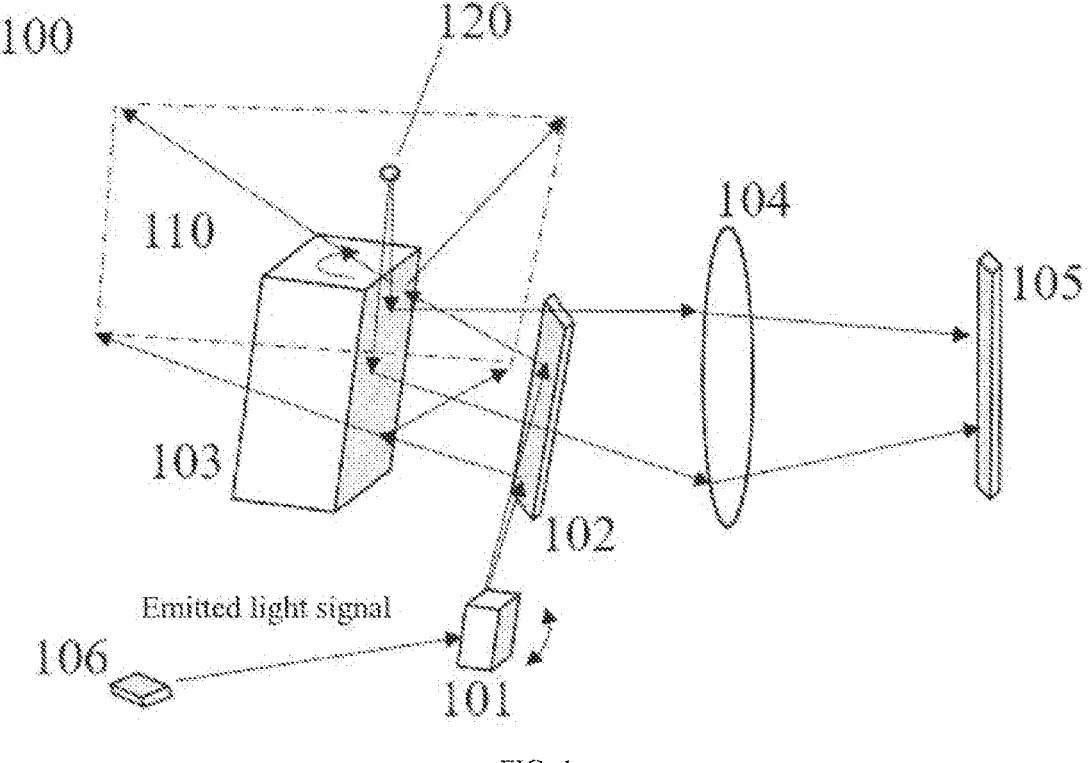
FIG. 1 shows a schematic diagram of a lidar system.

FIG. 1 shows a schematic diagram of a lidar system.

In FIG. 1, a lidar system 100 includes a MEMS mirror 101, a reflecting mirror 102, a polygonal rotating mirror 103, a receiving mirror 104, a photoelectric converter 105 and a light source 106. FIG. 1 further shows a target scene 110 and an echo light signal 120, and the target scene 110 is the space where the object to be measured is located. In FIG. 1, the propagation direction of the emitted light signal after being reflected by the polygonal rotating mirror 103 is represented by the dotted lines, and the dotted line frame only illustrates approximate orientation of the target scene 110 but does not reflect actual size of the target scene 110.

The emitted light signal emitted from the light source 106 is reflected by the MEMS mirror 101 to the reflecting mirror 102, further reflected to the polygonal rotating mirror 103, and then reflected to the target scene 110. It can be appreciated that the echo signal 120 reflected from the object to be measured in the target scene 100 passes through the polygonal rotating mirror 103 and thereafter is collected by the receiving mirror 104 and converged to the photoelectric converter 105.

Because the echo light signal 120 has not passed through the MEMS mirror, the direction of the echo light signal 120 reflected from the object to be measured in the target scene 110 after passing through the polygonal rotating mirror 103 is different from the direction of the emitted light signal before passing through the MEMS mirror 101, resulting in the angle range of the echo light signal 120 in the vertical direction when it enters the receiving mirror 104 is substantially the same as the vertical scanning angle of the MEMS mirror 101. Due to the existence of a certain angle range, the echo light signal 120 is converged to an imaging plane and presents a narrow strip distribution, and this imaging plane corresponds to the photoelectric converter 105.

Figure 2:
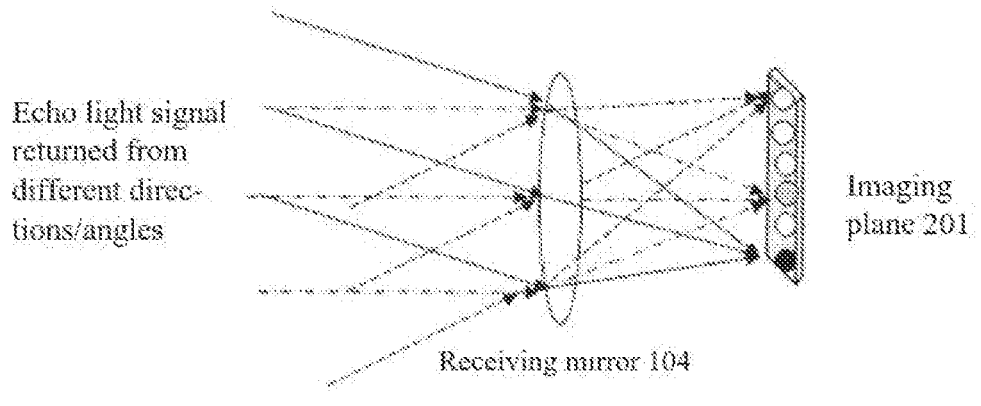
FIG. 2 is a schematic diagram of converging echo signals with a receiving mirror in the prior art.

FIG. 2 is a schematic diagram of converging echo signals with a receiving mirror in the prior art.

Referring to FIG. 2, echo signals returned from different directions or angles are converged onto the imaging plane 201 via the receiving mirror 104. In FIG. 2, echo light signals in different directions or angles are represented with different lines, and echo light signals in the same directions or angles are represented with the same lines.

Continuing to refer to FIG. 1, the photoelectric converter 105 is usually disposed at the imaging plane of the receiving mirror 104, and in order to receive the echo light signals 120 returned from different angles, the photoelectric converter 105 also needs to cover the strip-shaped image. The large-area photoelectric converter is, however, expensive and has slow dynamic response, and thus is not suitable for on-vehicle commercial applications.

In order to reduce the area of the photoelectric converter and reduce the cost, at least one embodiment of the present disclosure provides an optical waveguide device used in a laser ranging system. By using the optical waveguide device provided by the present disclosure, echo light signals with a large angle can also be collected using a photoelectric receiver with a small size.

Figure 3A:
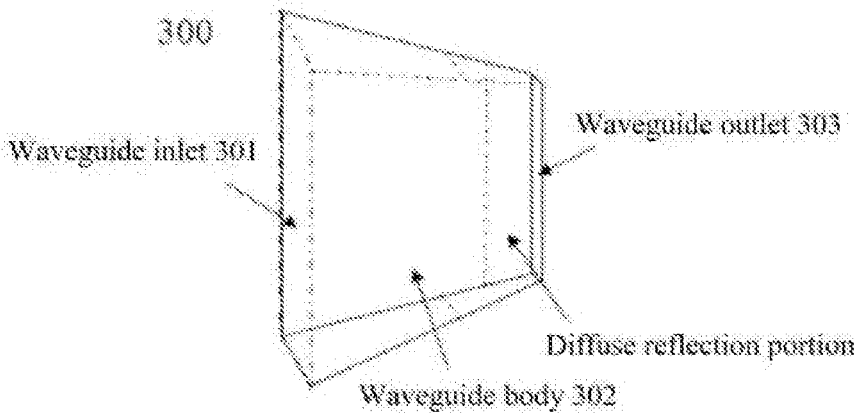
FIG. 3A is a schematic diagram of an optical waveguide device used in a laser ranging system, which is provided according to at least one embodiment of the present disclosure.

FIG. 3A is a schematic diagram of an optical waveguide device used in a laser ranging system according to at least one embodiment of the present disclosure.

In FIG. 3A, an optical waveguide device 300 includes a waveguide inlet 301, a waveguide body 302 and a waveguide outlet 303. The waveguide inlet 301 is configured to receive a first light signal, the first signal is for example an echo light signal reflected from a target scene. The waveguide body 302 is configured to guide the first light signal to transmit in the optical waveguide device 300. The waveguide outlet 303 is configured to output a second light signal that is exited after the first light signal is guided. The second light signal is exited to a photoelectric converter for ranging. A ratio of the area of the waveguide inlet 301 to that of the waveguide outlet 303 is greater than a first preset ratio, and a functional surface of the waveguide body 302 includes a diffuse reflection portion. For example, the value of the first preset ratio is 2 to 5. The large area of the waveguide inlet 301 can receive more echo light signals, thereby being applicable to measure scenes from a greater distance. The small area of the waveguide outlet 303 can limit the range of the exited second light signal, thereby reducing the imaging area of the second light signal, and in turn reducing the size of the required photoelectric converter and reducing the cost. The functional surface of the waveguide body 302 includes a diffuse reflection portion. The functional surface may be an inner surface, an outer surface, or a designated surface of the waveguide body 302. The functional surface of the waveguide body 302 provided with the diffuse reflection portion may effectively ensure the intensity of the exited light. It can be appreciated that, the diffuse reflection portion in FIG. 3A is only for illustration rather than limiting the actual position of the diffuse reflection portion on the functional surface.

Figure 3B:
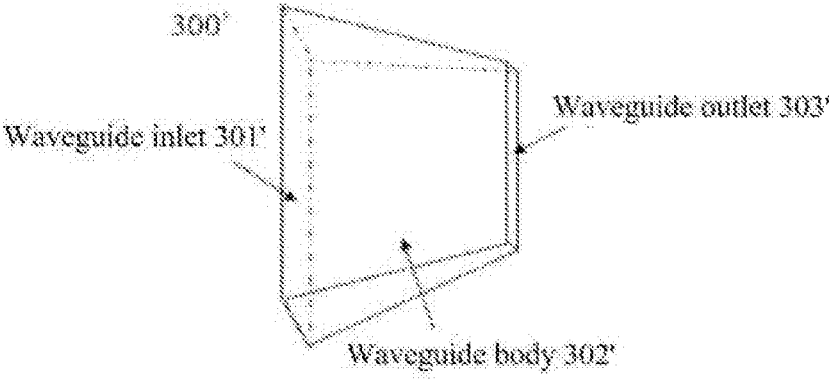
FIG. 3B is a schematic diagram of a further optical waveguide device used in a laser ranging system, which is provided according to at least one embodiment of the present disclosure.

FIG. 3B is a schematic diagram of a further optical waveguide device used in a laser ranging system provided according to at least one embodiment of the present disclosure.

As shown in FIG. 3B, an optical waveguide device 300' includes a waveguide inlet 301', a waveguide body 302' and a waveguide outlet 303'. The waveguide inlet 301' is configured to receive a first light signal, the first signal is for example an echo light signal reflected from a target scene. The waveguide body 302' is configured to guide the first light signal to transmit in the optical waveguide device 300'. The waveguide outlet 303' is configured to output a second light signal that is exited after the first light signal is guided. The second light signal is exited to a photoelectric converter for ranging. A ratio of the area of the waveguide inlet 301' to that of the waveguide outlet 303' is greater than a first preset ratio, and a functional surface of the waveguide body 302' includes a diffuse reflection portion. For example, the value of the first preset ratio is 2 to 5. The large area of the waveguide inlet 301' can receive more echo light signals, thereby being applicable to measure scenes from a greater distance. The small area of the waveguide outlet 303' can limit the scope of the exited second light signal, thereby reducing the imaging area of the second light signal, and in turn reducing the size of the required photoelectric converter and reducing the cost. Transmission efficiencies of the optical waveguide device 300' in the first direction and the second direction are different, the transmission efficiency in the first direction is greater than a first threshold, and the transmission efficiency in the second direction is smaller than a second threshold. For example, assuming that the first direction is the vertical direction and the second direction is the horizontal direction, the transmission efficiency of the optical waveguide device 300' in the vertical direction is greater than 50%, and the transmission efficiency in the horizontal direction is less than 50%. The first direction is different from the second direction, and the first direction and the second direction are not necessarily perpendicular to each other. It can be appreciated that, it is expected in the present disclosure that the transmission efficiency of the optical waveguide in the first direction is higher than a transmission threshold and the transmission efficiency in the second direction is lower than this transmission threshold, the values of the first threshold and the second threshold may be equal, or they may be configured according to the actual design and application.

The difference between the optical waveguide device 300 in FIG. 3A and the optical waveguide device 300' in FIG. 3B is that the diffuse reflection portion of the optical waveguide device 300 may not necessarily achieve different transmission efficiencies in different directions. It can be appreciated that, however, without affecting the realization of transmission efficiencies in different directions, the functional surface of the waveguide body of the optical waveguide device 300' can be provided with a diffuse reflection portion, and as for the specific arrangement, reference can be made to the optical waveguide device 300.

Optionally, a ratio of the intensity of the second light signal to that of the first light signal of the optical waveguide device 300 and the optical waveguide device 300' in the above embodiments is smaller than a second preset ratio. The second preset ratio is for example 0.5.

Since the structures of the optical waveguide device 300 and the optical waveguide device 300' are similar, only the optical waveguide device 300 is used as an example for description below, and it can be appreciated that the relevant descriptions below are also applicable to the optical waveguide device 300'.

Figure 3C:
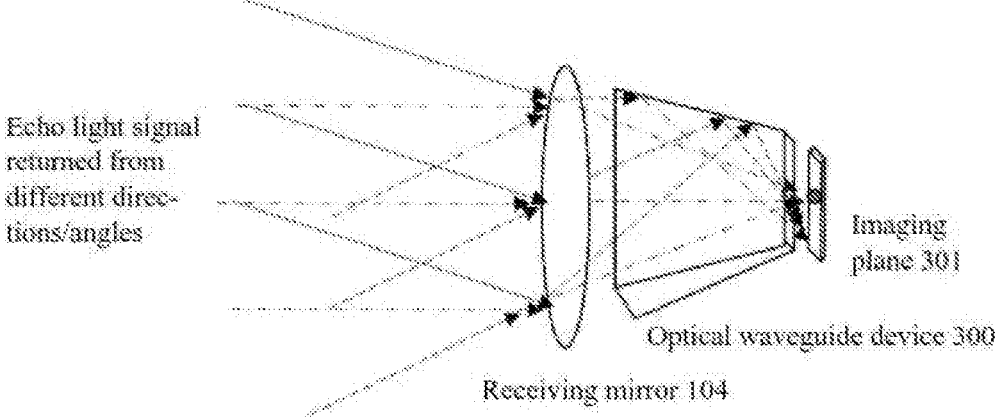
FIG. 3C shows a schematic diagram of converging echo light signals with a receiving mirror 104 and an optical waveguide device 300, which is provided according to an embodiment of the present disclosure.

FIG. 3C shows a schematic diagram of converging echo light signals with the receiving mirror 104 and the optical waveguide device 300, which is provided according to an embodiment of the present disclosure.

In FIG. 3C, echo light signals returned from different directions or angles firstly enter the receiving mirror 104, the echo light signals will initially converge after passing through the receiving mirror 104, thereafter enter the optical waveguide device 300, and are further converged by the optical waveguide device 300 to the imaging plane 301. Comparing FIG. 3C with FIG. 2, the echo light signal still includes light with a large angle after passing through the receiving mirror 104, and thus a longer length of the imaging plane 201 is required to receive all the exited light, while the echo light signals are further converged as passing through the light waveguide device 300, such that the length of the imaging plane 301 of the final exited light is significantly reduced.

Continuing to refer to FIG. 3A, at least a portion of the functional surface of the waveguide body 302 close to the waveguide outlet 303 is a diffuse reflection surface, and at least a portion of the functional surface of the waveguide body 302 close to the waveguide inlet 301 is a specular reflection surface.

Figure 3D:
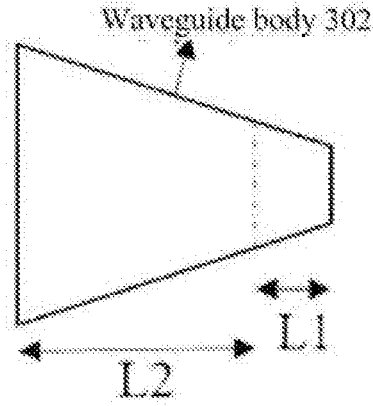
FIGS. 3D and 3E are schematic diagrams of the projection of the optical waveguide device 300, respectively.
Figure 3E:
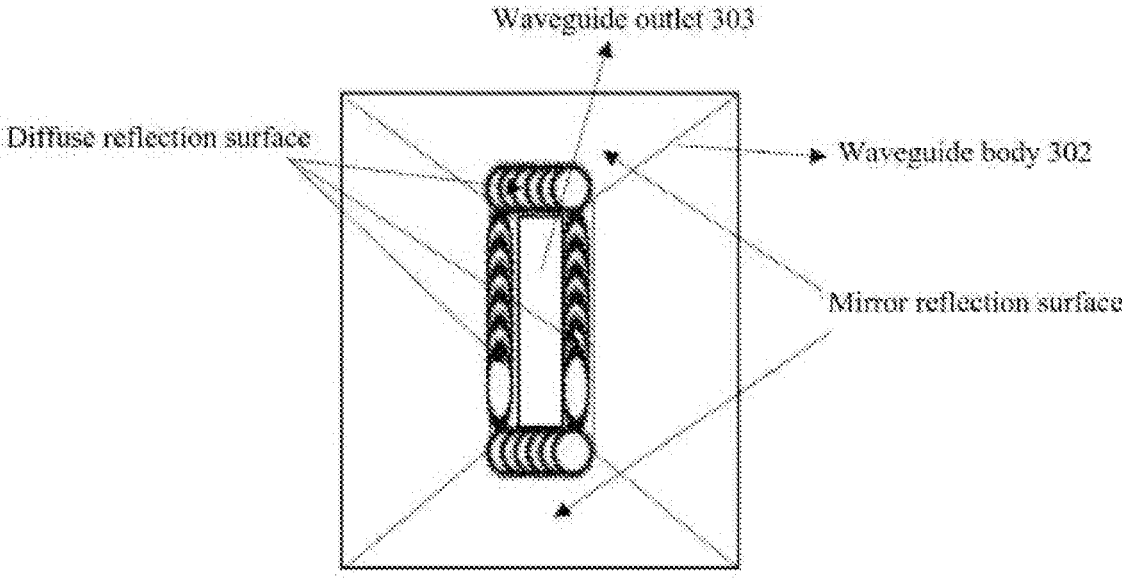

FIGS. 3D and 3E are schematic diagrams of the projection of the optical waveguide device 300, respectively.

FIG. 3D is the projection of the reflection surface of the waveguide body 302 of the optical waveguide device 300, L1 is a projected length of the diffuse reflection surface close to the waveguide outlet 303, and L2 is a projected length of the specular reflection surface close to the waveguide inlet 301.

FIG. 3E is a schematic diagram of the projection viewing from the waveguide inlet 301 to the waveguide outlet 303. The diffuse reflection surface in FIG. 3E is also disposed close to the waveguide outlet 303, and the specular reflection surface is disposed close to the waveguide inlet 301.

The optical waveguide device 300 in this embodiment is not a reflecting mirror structure. With the pure reflecting mirror structure, the incident light with a large incident angle will be reflected out by the mirror surface and cannot be received by the photoelectric converter at the waveguide outlet. When the surface of the waveguide body is a diffuse reflection structure, the incident light is scattered forward, and the photoelectric converter can receive the echo light signal with a large intensity.

Figure 3F:
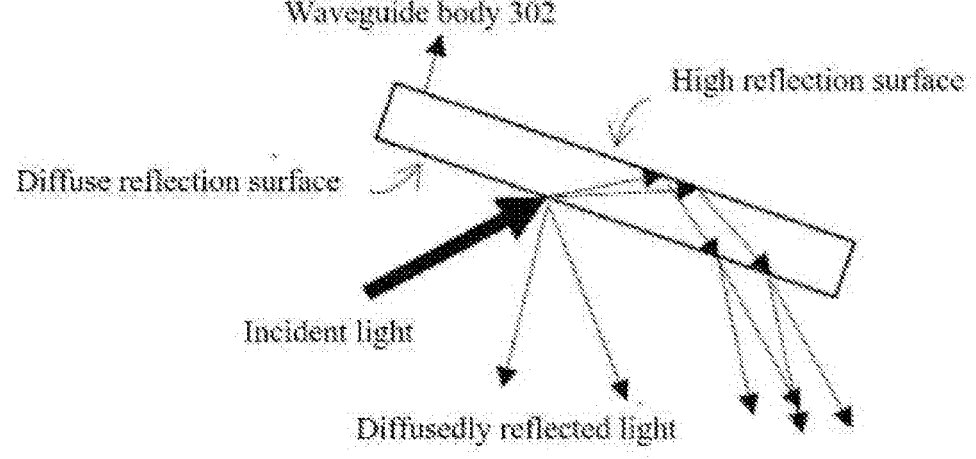
FIG. 3F shows a schematic diagram of a partial structure of the optical waveguide device 300.

FIG. 3F shows a schematic diagram of a partial structure of the optical waveguide device 300.

FIG. 3F cuts out a partial structure of the waveguide body 302. It can be appreciated that the waveguide body 302 has a thickness, and FIGS. 3A to 3D do not show the thickness in order to clearly show the structure of the optical waveguide device 300. When the inner surface of the waveguide body 302 is arranged as a diffuse reflection surface, part of the incident light is diffusely reflected, and part of the incident light is projected to a high reflection surface of the outer layer, and then reflected again by the high reflection surface. Optionally, the diffuse reflection surface and the specular reflection surface may be disposed on the outer surface or the inner surface of the waveguide body 302.

Figure 3G:
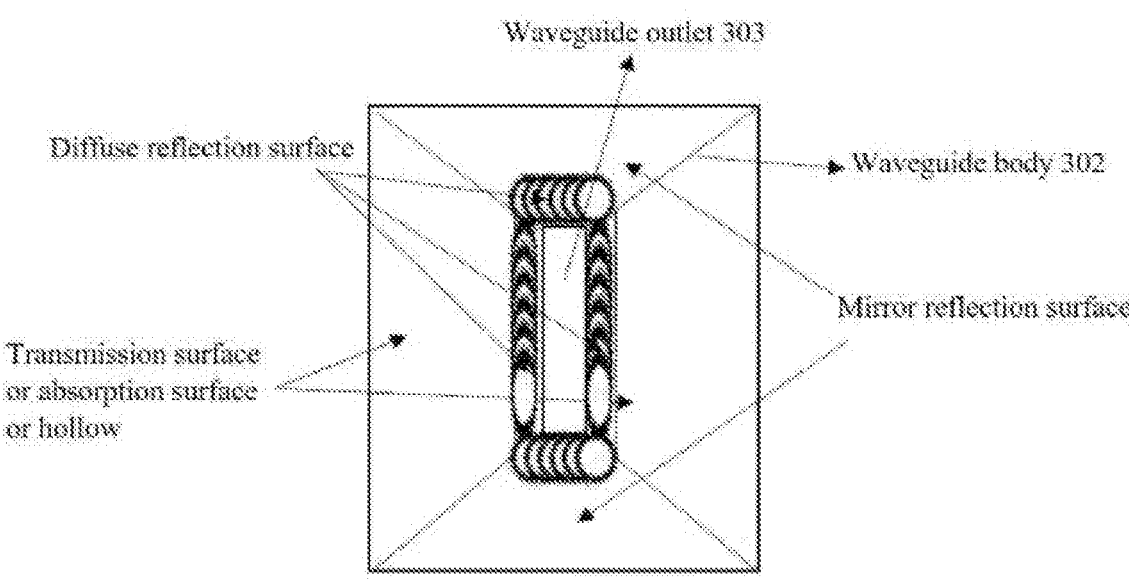
FIG. 3G shows a schematic diagram of the projection viewing from a waveguide inlet 301 to a waveguide outlet 303.

FIG. 3G shows a schematic diagram of the projection viewing from the waveguide inlet 301 to the waveguide outlet 303.

Similar to FIG. 3E, the diffuse reflection surface is disposed close to the waveguide outlet 303, a portion of the functional surface close to the waveguide inlet 301 is arranged as a specular reflection surface, and the other portion of the surface is arranged as a transmission surface or an absorption surface or a hollow.

Taking the projection in FIG. 3G as an example, for echo light signals in the vertical direction, the function of the optical waveguide device 300 is to collect them as much as possible, and thus the upper and lower functional surfaces are arranged as specular reflection surfaces. For large-angle incident lights in the horizontal direction, the function of the optical waveguide device 300 is to guide them out as much as possible, and thus the functional surfaces of the left and right parts are arranged as transmission surfaces or absorption surfaces or hollow, such that the echo light signals emitted to the two parts of functional surfaces are either transmitted out of the optical waveguide device 300 or absorbed. Under this design, light incident at a large horizontal angle would not be collected by the photoelectric converter, so it will not interfere with the lidar system. It can be appreciated that the "vertical" and "horizontal" directions above are used for illustration only, the function of the optical waveguide device 300 is to collect the echo light signals in the first direction as much as possible and guide out the echo light signals in the second direction as much as possible, the first direction and the second direction here are different.

Further optionally, a ratio of the intensity of the second light signal to that of the first light signal is greater than a fifth preset ratio within a predetermined field of view, and a ratio of the intensity of the second light signal to that of the first light signal is smaller than the fifth preset ratio outside the predetermined field of view. For example, for the field of view in the horizontal direction, the intensity of the second light signal is smaller than the intensity of the first light signal, and for the field of view in the vertical direction, the intensity of the second light signal is greater than the intensity of the first light signal. The value of the fifth preset ratio is for example 0.8.

The optical waveguide device 300 in the embodiment of the present disclosure may be metal and may also be dielectric. The inner surface of the optical waveguide made of metal can be highly reflective or diffusely reflective. As for the optical waveguide device with a dielectric structure, the reflection surface can be disposed on the inner or outer surface of the waveguide structure. In the present disclosure, reflectance of high reflection is greater than or equal to 50%, and reflectance of specular reflection is greater than or equal to 90%.

Optionally, the waveguide body 302 includes a first waveguide surface, a second waveguide surface, a third waveguide surface and a fourth waveguide surface that are close to and/or connected to each other. At least one surface of the first waveguide surface, the second waveguide surface, the third waveguide surface and the fourth waveguide surface include a first portion close to the waveguide outlet 303, and the first portion projects part of the first light signal propagated thereon to the waveguide outlet 303. In this embodiment, the four waveguide surfaces included in the waveguide body 302 may be plane or curved surfaces. For example, the first portion projects the echo light signal to the waveguide outlet 303 and make it exited to the photoelectric converter. For example, the surfaces of the left and right parts in FIG. 3G are the first waveguide surface and the second waveguide surface, and functional surfaces of the upper and lower parts are the third waveguide surface and the fourth waveguide surface. These four waveguide surfaces all have the first portion, that is, the diffuse reflection surface.

Continuing with the previous example, the first second waveguide surfaces further include a second portion close to the waveguide inlet 301, and the second portion reflects part of the first light signal incident thereon to the waveguide inlet 301 or transmits the same out of the waveguide body 302 or absorbs the same. For example, the second portion is an absorption surface, so that the first light signal incident on the second portion is absorbed.

Optionally, each waveguide surface of the first to fourth waveguide surfaces can be provided with a first portion and a second portion, and a ratio between the first portion and the second portion in each waveguide surface may be the same, or may be completely different, but they all need to ensure that the size of the first portion is smaller than that of the second portion. For example, a projected width of the first portion is smaller than a projected width of the second portion, or the area of the first portion is smaller than that of the second portion. For example, a ratio between the first portion and the second portion in the first waveguide surface is less than or equal to a third preset ratio, and a ratio between the first portion and the second portion in the second waveguide surface is less than or equal to the third preset ratio; a ratio between the first portion and the second portion in the third waveguide surface is less than or equal to a fourth preset ratio, and a ratio between the first portion and the second portion in the fourth waveguide surface is less than or equal to the fourth preset ratio. The third preset ratio is for example 0.7, and the fourth preset ratio is for example 0.65.

Figure 4:
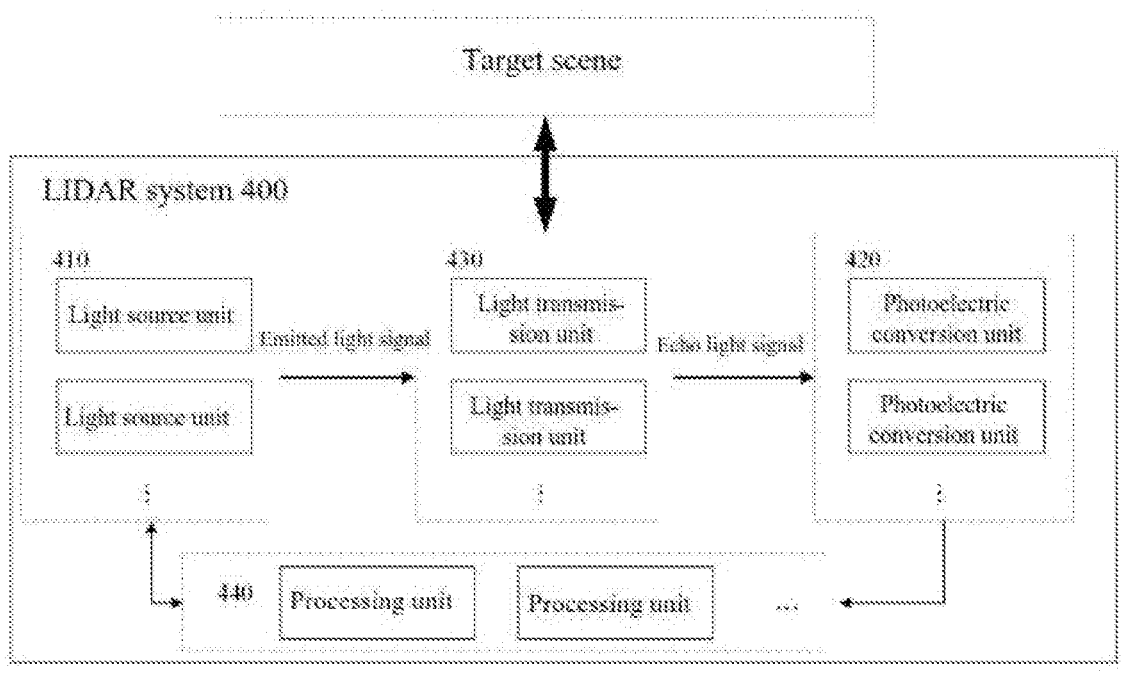
FIG. 4 shows a schematic diagram of a lidar system provided according to at least one embodiment of the present disclosure.

FIG. 4 shows a schematic diagram of a lidar system provided according to at least one embodiment of the present disclosure.

As shown in FIG. 4, a lidar system 400 includes at least one light source unit 410, at least one photoelectric conversion unit 420, at least one light transmission unit 430, and a signal processing unit 440. The at least one light source unit 410 generates and emits an emitted light signal, the emitted light signal enters the target scene via the at least one light transmission unit 430 and is reflected by the object to be measured to obtain an echo light signal, which is guided to the at least one photoelectric conversion unit 420 after being received by the at least one light transmission unit 410.

In this embodiment, the light source unit is configured to emit an emitted light signal, and after the emitted light signal is reflected by at least one target object in the target scene, part of the reflected light signal is received by the lidar system as an echo light signal. The target object comprises human beings, cars, buildings and so on. The emitted light signal includes information about emission start time of the emitted light signal.

The light transmission unit is configured to receive the emitted light signal and send it to the target scene; and/or receive the echo light signal and send it to the photoelectric conversion unit.

The photoelectric conversion unit is configured to convert the echo light signal into a received photoelectric signal, and the received photoelectric signal contains information about the time when the echo light signal is received.

The signal processing unit is configured to generate a scan control signal to control at least one scanning unit and/or obtain a scan feedback signal from the at least one scanning unit, and to determine at least one of a distance of the target object, a reflectivity of the target object, a directional angle of the target object, and a profile of the target object according to the reflected light signal, the received photoelectric signal, the scan control signal and the scan feedback control signal. In FIG. 4, the signal processing unit 440 is connected to the light source unit 410 and the photoelectric conversion unit 430. The signal processing unit 440 controls the light source unit 410 to emit the emitted light signal. The signal processing unit 440 further receives the received light signal from the photoelectric conversion unit 430 to calculate the physical distance, emissivity, directional angle and profile of the target. For example, one processing unit in the signal processing unit 440 controls the light source unit 410, while another processing unit performs calculations related to the target object.

The light transmission unit includes at least one receiving lens unit and at least one optical waveguide unit. The receiving lens unit is configured to receive the echo light signal. The optical waveguide unit is configured to guide the echo light signal to the photoelectric conversion unit, a ratio of the area of the waveguide inlet in the optical waveguide unit to that of the waveguide outlet is greater than a first preset ratio, and a functional surface of the optical waveguide unit includes a diffuse reflection portion. The photoelectric conversion unit is disposed at a corresponding waveguide outlet to receive the light signal exited from the waveguide outlet. For example, the optical waveguide unit in this embodiment is the optical waveguide device of any one of the embodiments described above.

Figure 5A:
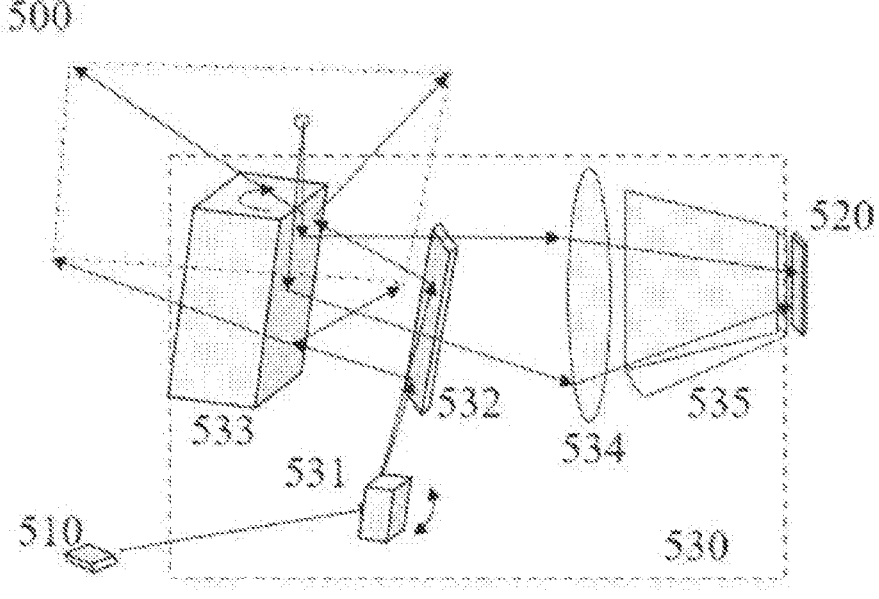
FIG. 5A shows a schematic diagram of an implementation of a lidar system of an embodiment of the present disclosure.

FIG. 5A shows a schematic diagram of an implementation of a lidar system of an embodiment of the present disclosure.

In FIG. 5A, a lidar system 500 includes a light source unit 510, a photoelectric conversion unit 520 and a light transmission unit 530. The light transmission unit 530 includes a scanning unit 531, a reflecting mirror unit 532, a polygonal rotating mirror unit 533, a receiving lens unit 534 and an optical waveguide unit 535.

The light source unit 510 emits an emitted light signal. The scanning unit 531 scans the emitted light signal and transmits it to the reflecting mirror unit 532. The reflecting mirror unit 532 continues to reflect the emitted light signal to the polygonal rotating mirror unit 533. The polygonal rotating mirror unit 533 reflects the emitted light signal into the target scene. The emitted light signal is reflected into an echo light signal in the target scene. The echo light signal is received by the polygonal rotating mirror unit 533 and reflected to the receiving lens unit 534. The receiving lens unit 534 converges the echo light signal and thereafter transmits it to the optical waveguide unit 535. The optical waveguide unit 535 guides the echo light signal to be a light signal with a small imaging area, which then propagates to the photoelectric conversion unit 520.

The scanning unit 531 is disposed between the light source unit 510 and the reflecting mirror unit 532 and can change the propagation direction of the emitted light signal. The scanning unit 531 includes at least one of a MEMS vibrating mirror, a rotating prism, a rotating polygonal mirror, a rotating wedge mirror, an optical phase array, a photoelectric deflection device, and a liquid crystal scanning part, and the liquid crystal scanning part includes a liquid crystal spatial light modulator, a liquid crystal super crystal surface, liquid crystal line-controlled array, a see-through one-dimensional liquid crystal array, a transmissive two-dimensional liquid crystal array or a liquid crystal display module. The scanning unit can change the propagation direction of the emitted light signal and/or the echo light signal according to different locations of the scanning unit.

The polygonal rotating mirror unit 533 is configured to rotate around a vertical axis of the polygonal rotating mirror unit 533, reflect the emitted light signal reflected by the incident light receiving unit into the target scene, and/or reflect the echo light signal returned from the target scene to the optical waveguide unit 535. Optionally, the polygonal rotating mirror unit 533 is a polyhedron prism, such as a 4-side rotating mirror, an 8-side rotating mirror or a 16-side rotating mirror.

The light source unit 510 is one of a semiconductor laser, a fiber laser, a solid-state laser, a Raman laser, an optical parametric amplifier, or a combination thereof. For example, a wavelength of the emitted light signal emitted from the light source unit 510 is one of 800 nm-900 nm, 900 nm-1000 nm, 1000 nm-1300 nm, 1300 nm-1600 nm, and 1600 nm-3 um.

The photoelectric conversion unit 520 is one of a photo-diode, an avalanche photodiode, and a single photon detector. Moreover, a photosensitive surface of the photoelectric conversion unit 520 has a structure matching an exiting end of the optical waveguide unit 535. Optionally, the photo-sensitive surface is rectangular, wherein a ratio of length to width is at least 2:1 and at most 100:1. Further optionally, the photoelectric conversion unit 520 has a single structure with one output, and/or a combined structure of multiple small units and multiple outputs.

The receiving lens unit 534 includes at least one focusing mirror or lens, including but not limited to a positive lens, a curved mirror, and a combination of lenses.

It can be appreciated that, in the following, the same or similar reference numerals refer to the same or similar components, and as for the same or similar components, reference can be made to the above description, no details will not be repeated.

Figure 5B:
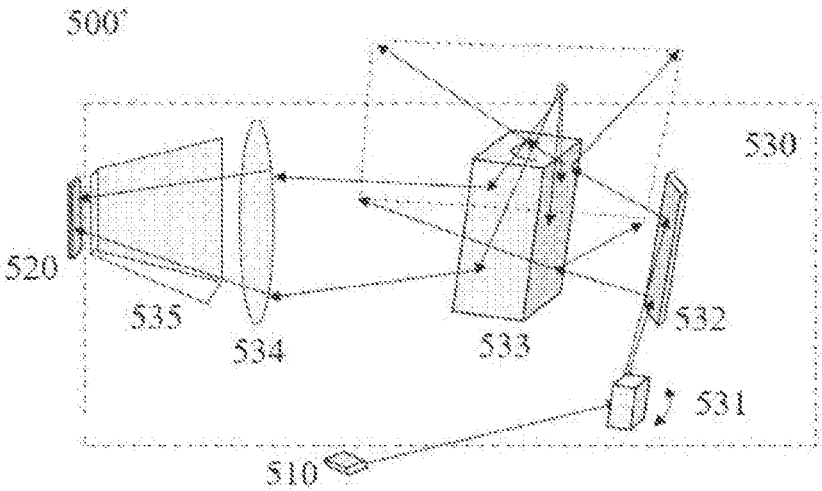
FIG. 5B shows a schematic diagram of another implementation of the lidar system of an embodiment of the present disclosure.

FIG. 5B shows a schematic diagram of another implementation of the lidar system of an embodiment of the present disclosure.

In FIG. 5B, the lidar system 500' has the same components as the lidar system 500 in FIG. 5A, except that the scanning unit 531 and the reflecting mirror unit 532 are disposed on one side of the polygonal rotating mirror unit 533, and that the receiving lens unit 534 and the optical waveguide unit 535 are disposed on the other side of the polygonal rotating mirror unit 533. Therefore, the lidar system can be arranged more flexibly for different spaces.

Figure 5C:
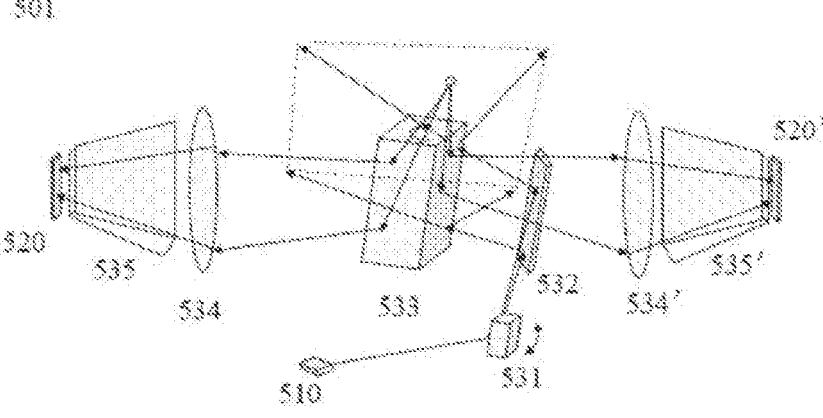
FIG. 5C shows a schematic diagram of a further implementation of the lidar system of an embodiment of the present disclosure.

FIG. 5C shows a schematic diagram of a further implementation of a lidar system of an embodiment of the present disclosure.

The lidar system 501 includes a light source unit 510, photoelectric conversion units 520 and 520', a scanning unit 531, a reflecting mirror unit 532, a polygonal rotating mirror unit 533, receiving lens units 534 and 534', and optical waveguide units 535 and 535'.

The polygonal rotating mirror 533 further reflects the echo light signal returned from the target scene to the optical waveguide units 535 and 535'.

Figure 5D:
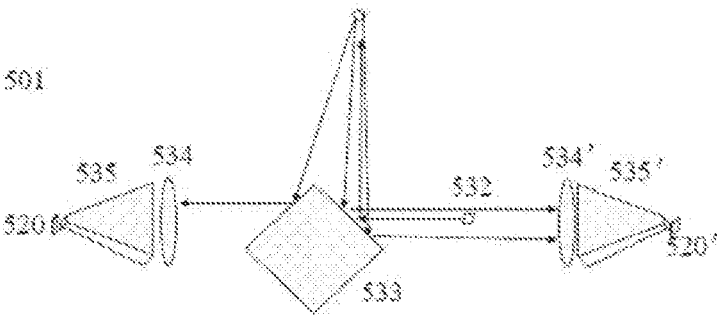
FIG. 5D is a top view of the lidar system in FIG. 5C.

FIG. 5D is a top view of the lidar system in FIG. 5C. Referring to FIGS. 5C and 5D, the optical waveguide units 535 and 535' are disposed symmetrically with respect to the polygonal rotating mirror unit 533, and the optical wave-guide units 535 and 535' are disposed on two sides of the polygonal rotating mirror unit 533, respectively. By adopting the solution in this embodiment, the optical aperture of the lidar system is equivalently increased, thereby improving the capability of receiving the emitted light signal and the echo light signal.

Figure 5E:
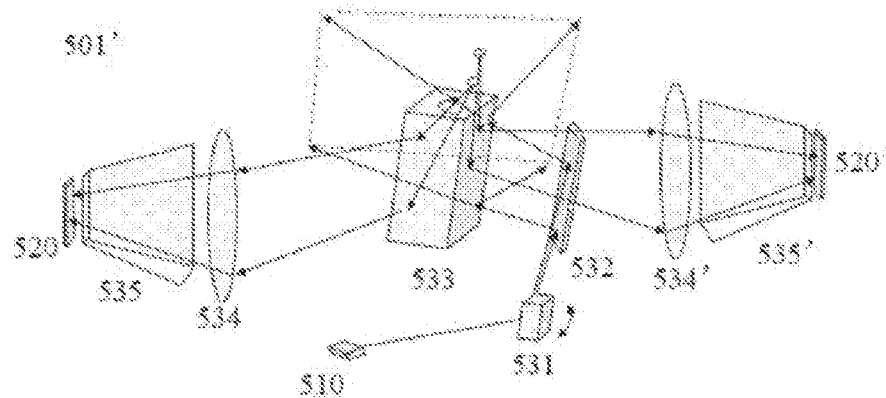
FIG. 5E shows a schematic diagram of yet another implementation of the lidar system of an embodiment of the present disclosure.

FIG. 5E shows a schematic diagram of yet another implementation of a lidar system of an embodiment of the present disclosure.

The lidar system 501' has the same components as the lidar system 501, the difference is that the optical waveguide units 535 and 535' are disposed staggered from each other relative to the polygonal rotating mirror unit 533. Accordingly, the photoelectric conversion units 520 and 520' are also disposed staggered from each other. By adopting the solution in this embodiment, the receiving angle of the lidar system is equivalently increased, thereby improving the capability of receiving the emitted light signal and the echo light signal.

Figure 5F:
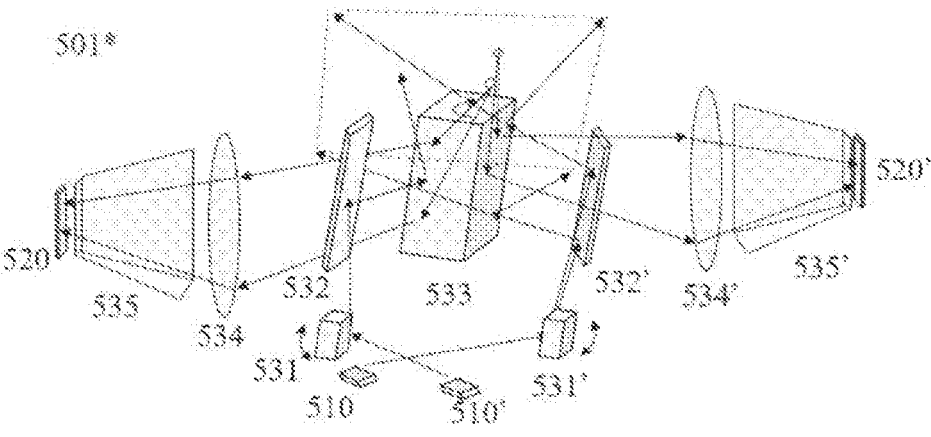
FIG. 5F shows a schematic diagram of a further implementation of the lidar system of an embodiment of the present disclosure.

FIG. 5F shows a schematic diagram of a further implementation of a lidar system of an embodiment of the present disclosure.

In FIG. 5F, the lidar system 501* includes light source units 510 and 510', photoelectric conversion units 520 and 520', scanning units 531 and 531', reflecting mirror units 532 and 532', a polygonal rotating mirror unit 533, a receiving lens unit 534 and a receiving lens unit 534', and optical waveguide units 535 and 535'. That is, the lidar system 501* includes two light source units, two light transmission units and two corresponding photoelectric conversion units.

The scanning units 531 and 531' share one polygonal rotating mirror unit 533. The scanning units 531 and 531' are configured to scan different angles. Alternatively, the light source units 510 and 510' are configured to emit at different time. This solution can improve point cloud density, spatial scanning angle and angular resolution. Optionally, the lidar system 501* may be provided with only one light source unit 510, so that the light source unit 510 sends the emitted light signals to the scanning units 531 and 531' at staggered times.

It should be noted that in the lidar system shown in FIGS. 5B to 5F, the polygonal rotating mirror unit 533 is multi-plexed, in this case, the polygonal rotating mirror unit 533 needs to be provided with 4 prisms, 8 prisms or 16 prisms to make the lidar system operate normally.

Optionally, a luminous power ratio of the light source unit 510 to the light source unit 510' is configured according to a preset ratio. The preset ratio is 1:1, 1:2, 1:5, 1:10, 1:100, 1:1000, 1:10000, or 1:100000. A photoelectric gain ampli-fication ratio required during reception for correspondingly receiving the two light source units is configured according to a preset ratio. The preset ratio is 1:1, 1:2, 1:5, 1:10, 1:100, 1:1000, 1:10000, or 1:100000.

Figure 5G:
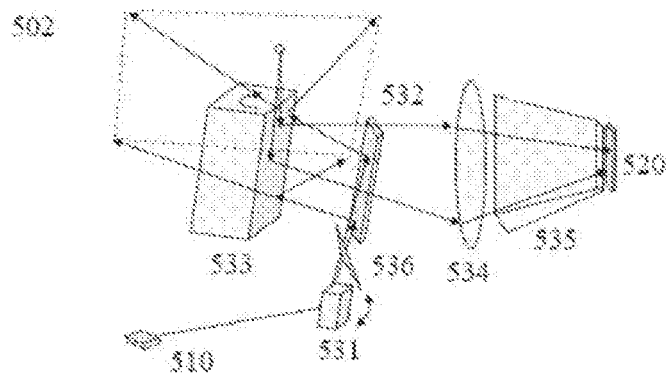
FIGS. 5G and 5I show schematic diagrams of another implementation of the lidar system of an embodiment of the present disclosure, respectively.
Figure 5H:
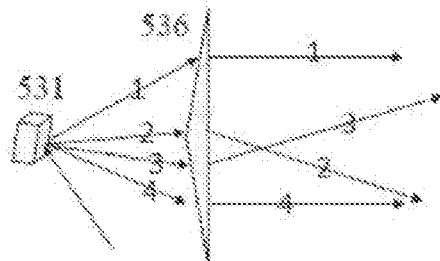
FIG. 5H is a partial structural diagram of the lidar system in FIG. 5G.
Figure 5I:
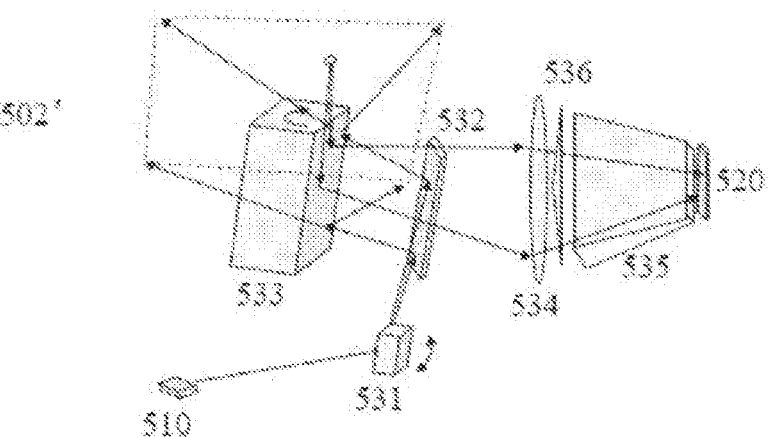

FIGS. 5G and 5I show schematic diagrams of another implementation of a lidar system of an embodiment of the present disclosure, respectively.

The lidar system 502 in FIG. 5G and the lidar system 502' in FIG. 5I each include a light source unit 510, photoelectric conversion units 520 and 520', a scanning unit 531, a reflecting mirror unit 532, a polygonal rotating mirror unit 533, a receiving lens unit 534, an optical waveguide unit 535 and a prism unit 536.

The prism unit 536 can change the propagation direction of the emitted light signal and/or the echo light signal, such that the propagation angle of partial light signal of the emitted light signal or the echo light signal with a large propagation angle is reduced, and the propagation angle of partial light signal of the emitted light signal or the echo light signal with a small propagation angle is increased. In the lidar system 502, the prism unit 536 is disposed between the scanning unit 531 and the reflecting mirror unit 532, thereby it can change the propagation direction of the emitted light signal. In the lidar system 502', the prism unit 536 is disposed between the receiving lens unit 534 and the optical waveguide unit 535, thereby it can change the propagation direction of the echo light signal.

FIG. 5H is a partial structural diagram of the lidar system in FIG. 5G.

The scanning unit 531 and the prism unit 536 are shown in FIG. 5H. The prism unit 536 may be a wedge mirror. The material of the prism unit includes but not limited to one of optical glass, optical crystal, silicon crystal and germanium crystal.

When the scanning unit 531 is a MEMS mirror and the scanning direction thereof is the vertical direction, the emission angle in the vertical direction is not uniform when pulses are emitted at uniform time intervals, and the extreme angular density of the FOV is very large, the number of scanning lines in the front is small, the scanning efficiency is low. In order to improve the scanning efficiency and increase the number of scanning lines in front, one prism unit 536 is disposed between the scanning unit 531 and reflecting mirror unit 532. This prism unit 536 reverses the scanning mode of the MEMS. When pulses are emitted at uniform time intervals, the number of scanning lines in the vertical direction is large, and the number of scanning lines at extreme angles of the FOV is small, and the scanning distribution is reasonable.

The prism unit 536 is disposed between the receiving lens unit 534 and the optical waveguide unit 535, the prism unit 536 can refract the upward or downward echo light signal to the center and improve the receiving efficiency of the echo light signal incident at a large angle.

Figure 5J:
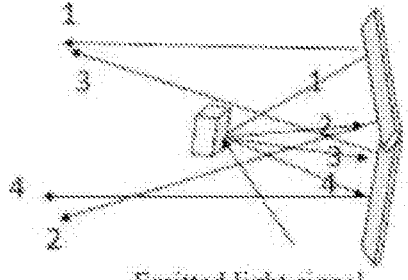
FIG. 5J is a schematic diagram of another implementation of the partial structure in FIG. 5H.

FIG. 5J is a schematic diagram of another implementation of the partial structure of FIG. 5H.

In FIG. 5J, the prism unit 536 is replaced with a composite reflecting mirror unit. The function and location of the composite reflecting mirror unit are similar to those of the prism unit 536, but the cost can be further reduced.

Figure 5K:
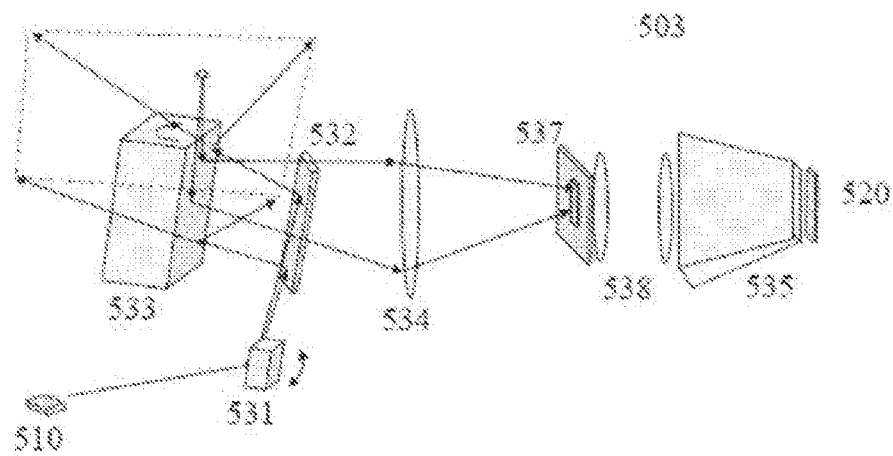
FIG. 5K shows a schematic diagram of a further implementation of the lidar system of an embodiment of the present disclosure.

FIG. 5K shows a schematic diagram of a further implementation of a lidar system of an embodiment of the present disclosure.

A lidar system 503 includes a light source unit 510, photoelectric conversion units 520 and 520', a scanning unit 531, a reflecting mirror unit 532, a polygonal rotating mirror unit 533, a receiving lens unit 534, an optical waveguide unit 535, a diaphragm unit 537, and optically a lens combination unit 538.

The diaphragm unit 537 can intercept the light in part of the propagation directions of the echo light signal. The diaphragm unit 537 may be disposed between the optical waveguide unit 535 and the target scene. That is, the echo light signal first passes through the diaphragm unit 537 and then propagates into the optical waveguide unit 535. In FIG. 5K, the diaphragm unit 537 is disposed between the receiving lens unit 534 and the lens combination unit 538, the diaphragm unit 537 intercepts the light in the horizontal direction and transmits the light in the vertical direction, thereafter the lens combination unit 538 again converges the echo light signal that passes through the aperture unit 537 and propagates it to the optical waveguide unit 535.

Figure 6A:
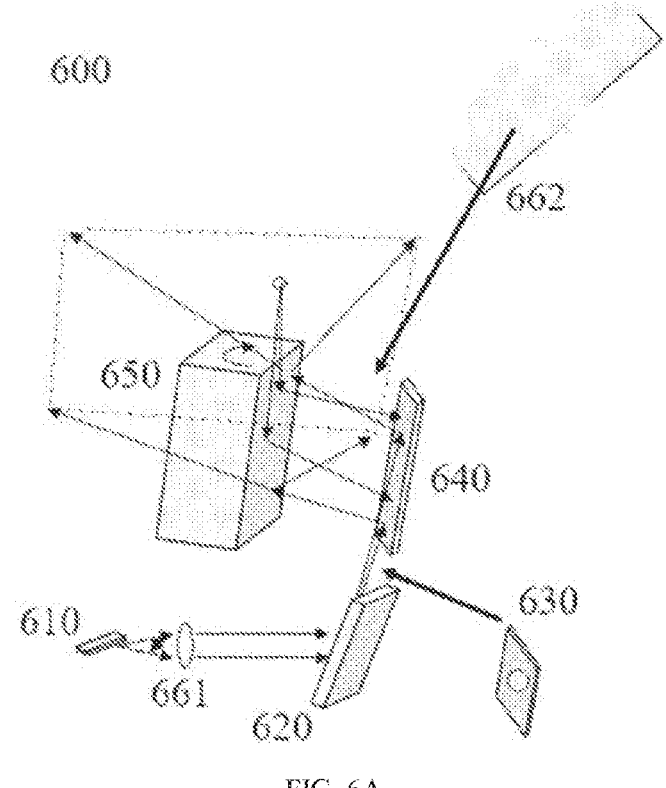
FIG. 6A shows a schematic diagram of another implementation of the lidar system according to an embodiment of the present disclosure.
Figure 6B:
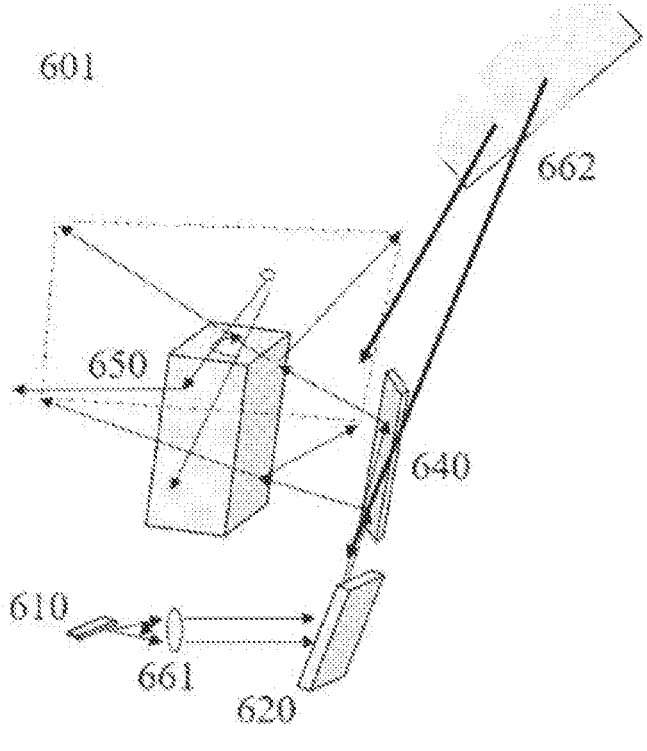
FIG. 6B shows a schematic diagram of another implementation of the lidar system according to an embodiment of the disclosure.

Further implementations of the lidar system are described below in conjunction with FIGS. 6A and 6B. FIGS. 6A and 6B only show the transmission path of the emitted light signal and the corresponding components of the lidar system. For the part of the echo light signal, reference can be made to the configuration in the above embodiments, no description is provided here.

FIG. 6A shows a schematic diagram of another implementation of a lidar system according to an embodiment of the present disclosure.

A lidar system 600 includes a light source unit 610, a scanning unit 620, a perforated reflecting mirror unit 630, a reflecting mirror unit 640, a polygonal rotating mirror unit 650 and a collimating lens unit 660. The collimator lens unit 660 includes a first one-dimensional collimator lens unit 661 and a second one-dimensional collimator lens unit 662.

The light source unit 610 is a semiconductor laser, and it emits the emitted light signals in two directions: a fast divergence angle direction and a slow divergence angle direction. The emitted light signals are reflected to the target scene after passing through the first one-dimensional collimating lens unit 661, the scanning unit 620, the perforated mirror unit 630, the reflecting mirror unit 640, the second one-dimensional collimating lens unit 662 and the polygonal rotating mirror unit 650 in sequence.

The first and second one-dimensional collimating lens unit 661 and 662 collimate the emitted light signals in the first direction and the second direction before the emitted light signal is reflected into the target scene. For example, the first one-dimensional collimating lens unit 661 collimates the emitted light signal at a fast divergence angle, and the second one-dimensional collimating lens unit 662 collimates the emitted light signal at a slow divergence angle. After the collimating lens unit 660 collimate the emitted light signals, the light spot of the emitted light signals will become smaller, thereby reducing the requirements on the optical aperture of the components in the lidar system.

FIG. 6B shows a schematic diagram of another implementation of a lidar system according to an embodiment of the disclosure.

A lidar system 601 includes a light source unit 610, a scanning unit 620, a reflecting mirror unit 640, a polygonal rotating mirror unit 650 and a collimating lens unit 660. The collimator lens unit 660 includes a first one-dimensional collimator lens unit 661 and a second one-dimensional collimator lens unit 662.

The lidar system 601 does not include the perforated mirror unit 630, and the second one-dimensional collimating lens unit 662 may be selectively disposed between the scanning unit 620 and the reflecting mirror unit 640, or disposed between the reflecting mirror unit 640 and the polygonal rotating mirror unit 650.

Optionally, the collimator lens unit 660 in FIGS. 6A and 6B may include only a two-dimensional collimator lens unit. The two-dimensional collimating lens unit needs to be disposed between the light source unit and the scanning unit, for example, between the light source unit 610 and the scanning unit 620, and at the position of the first one-dimensional collimating lens unit 661 in FIG. 6A. The two-dimensional collimator lens unit 660 can collimate partial light signal in the first direction and partial light signal in the second direction of the emitted light signals before they enter the scanning unit 620. Compared with the combination of two one-dimensional collimating lens units, a single two-dimensional collimating lens unit can reduce the occupied volume.

The optical waveguide unit in the above embodiments may be the optical waveguide device described in the above embodiments, such as the optical waveguide device 300.

In addition, the lidar system described above may also include a computing control component, which controls the respective components or modules to emit the emitted light according to a preset program, controls the photoelectric conversion unit in the receiving component, acquires scanning information, and calculates and obtains information at least including at least one of direction, distance and a target reflection intensity of the object to be measured.

The computing control component may be a processor, including at least one of Field Programmable Gate Array (FPGA), Microcontroller Unit (MCU), and Application Specific Integrated Circuit (ASIC). The processor can calculate an initially measured distance between the lidar system and an object and a reflectivity of the object according to an emission start time and a trigger start time. The emission start time may be the time when the light source unit emits the emitted light signal, and the trigger start time may be the time when the light signal is detected by the photoelectric conversion unit. As another example, the photoelectric conversion unit converts the echo light signal into an electrical pulse signal, uses a comparator to compare the electrical pulse signal with a preset threshold, and determines the time when the intensity of the electrical pulse signal is higher than the preset threshold as the trigger start time.

The computing control component may also include an amplifier and an analog-to-digital converter to amplify the electrical pulse signal and perform analog-to-digital conversion, so as to determine intensity and waveform of the electrical pulse signal.

The following points need to be explained:

(1) The appended drawings of the embodiments of the present disclosure only involve the structures involved in the embodiments of the present disclosure, and as for the other structures, reference can be made to the general design.

(2) In the case of no conflict, the embodiments of the present disclosure and the features in the embodiments can be combined with each other to obtain new embodiments.

The above description is only specific implementations of the present disclosure, but the scope of protection of the present disclosure is not limited thereto, the scope of protection of the present disclosure should be determined based on the scope of protection of the claims.

The invention claimed is:

1. An optical waveguide device used in a laser ranging system, the optical waveguide device comprising:
  a waveguide inlet configured to receive a first light signal;
  a waveguide body configured to guide the first light signal to transmit in the optical waveguide device; and
  a waveguide outlet configured to output a second light signal exited after the first light signal is guided;
  wherein a ratio of the area of the waveguide inlet to that of the waveguide outlet is greater than a first preset ratio, and a functional surface of the waveguide body contains a diffuse reflection portion.

2. An optical waveguide device used in a laser ranging system, the optical waveguide device comprising:
  a waveguide inlet configured to receive a first light signal;
  a waveguide body configured to guide the first light signal to transmit in the optical waveguide device; and
  a waveguide outlet configured to output a second light signal exited after the first light signal is guided;
  wherein a ratio of the area of the waveguide inlet to that of the waveguide outlet is greater than a first preset ratio, and transmission efficiencies of the optical waveguide device in first and second directions are different, the transmission efficiency in the first direction is greater than a first threshold, the transmission efficiency in the second direction is less than a second threshold.

3. The optical waveguide device according to claim 2, wherein at least a portion of the functional surface of the waveguide body close to the waveguide outlet is a diffuse reflection surface, and at least a portion of the functional surface of the waveguide body close to the waveguide inlet is a specular reflection surface.

4. The optical waveguide device according to claim 3, wherein at least a portion of the functional surface of the waveguide body close to the waveguide inlet is a transmission surface or an absorption surface or a hollow.

5. The optical waveguide device according to claim 2, wherein the waveguide body comprises a first waveguide surface, a second waveguide surface, a third waveguide surface and a fourth waveguide surface which are close to and/or connected to each other;
  wherein at least one surface of the first waveguide surface, the second waveguide surface, the third waveguide surface and the fourth waveguide surface comprise a first portion close to the waveguide outlet, and the first portion projects part of the first light signal propagated thereon to the waveguide outlet.

6. The optical waveguide device according to claim 5, wherein
  the first and second waveguide surfaces further comprise a second portion close to the waveguide inlet, and the second portion reflects part of the first light signal incident thereon to the waveguide inlet or transmits the same out of the waveguide body or absorbs the same.

7. The optical waveguide device according to claim 6, wherein
  a ratio between the first portion and the second portion in the first waveguide surface is less than or equal to a third preset ratio, and a ratio between the first portion and the second portion in the second waveguide surface is less than or equal to the third preset ratio;
  a ratio between the first portion and the second portion in the third waveguide surface is less than or equal to a fourth preset ratio, and a ratio between the first portion and the second portion in the fourth waveguide surface is less than or equal to the fourth preset ratio.

8. The optical waveguide device according to claim 2, wherein
  a ratio of the intensity of the second light signal to that of the first light signal is smaller than a second preset ratio.

9. The optical waveguide according to claim 2, wherein a ratio of the intensity of the second light signal to that of the first light signal is greater than a fifth preset ratio within a predetermined field of view, a ratio of the intensity of the second light signal to that of the first light signal is smaller than the fifth preset ratio outside the predetermined field of view.

10. A lidar system, comprising:
  at least one light source unit configured to emit an emitted light signal, and part of a reflected light signal after the emitted light signal is reflected by at least one target object in a target scene is received by the lidar system as an echo light signal, wherein the emitted light signal contains information about emission start time of the emitted light signal;
  at least one photoelectric conversion unit configured to convert the echo light signal into a received photoelectric signal, wherein the received photoelectric signal contains information about the time when the echo light signal is received;

at least one light transmission unit configured to receive the emitted light signal and send it to the target scene, and/or receive the echo light signal and send it to the at least one photoelectric conversion unit; and at least one signal processing unit configured to generate a scan control signal so as to control at least one scanning unit and/or obtain a scan feedback signal from the at least one scanning unit, and to determine at least one of a distance of the target object, a reflectivity of the target object, a directional angle of the target object, and a profile of the target object according to the reflected light signal, the received photoelectric signal, the scan control signal and the scan feedback control signal;

wherein the at least one light transmission unit comprises:

the at least one scanning unit configured to change a propagation direction of the emitted light signal and/or the echo light signal;

at least one receiving lens unit configured to receive the echo light signal;

at least one optical waveguide unit configured to guide the echo light signal to the at least one photoelectric conversion unit, a ratio of the area of the waveguide inlet to that of the waveguide outlet of the at least one optical waveguide unit is greater than a first preset ratio, and a functional surface of the at least one optical waveguide unit contains a diffuse reflection portion; wherein the at least one photoelectric conversion unit is disposed at a corresponding waveguide outlet to receive a light signal exited from the waveguide outlet.

11. The lidar system according to claim 10, wherein the at least one light transmission unit further comprises:

at least one prism unit configured to change the propagation direction of the emitted light signal and/or the echo light signal, so as to reduce the propagation angle of partial light signal of the emitted light signal or the echo light signal with a large propagation angle and to increase the propagation angle of partial light signal of the emitted light signal or the echo light signal with a small propagation angle;

wherein the at least one prism unit is disposed between the light source unit and the optical waveguide unit.

12. The lidar system according to claim 10, wherein the at least one light transmission unit further comprises:

at least one composite reflecting mirror unit configured to change the propagation direction of the emitted light signal or the echo light signal, so as to reduce the propagation angle of partial light signal of the emitted light signal or the echo light signal with a large propagation angle, and increase the propagation angle of partial light signal of the emitted light signal or the echo light signal with a small propagation angle;

wherein the at least one composite reflecting mirror unit is disposed between the light source unit and the optical waveguide unit.

13. The lidar system according to claim 10, wherein the scanning unit comprises at least one of a MEMS vibrating mirror, a rotating prism, a rotating polygonal mirror, a rotating wedge mirror, an optical phase array, a photoelectric deflection device, and a liquid crystal scanning part, wherein the liquid crystal scanning part comprises a liquid crystal spatial light modulator, a liquid crystal super crystal plane, a liquid crystal line-controlled array, a see-through one-dimensional liquid crystal array, a transmissive two-dimensional liquid crystal array or a liquid crystal display module.

14. The lidar system according to claim 10, wherein the at least one light transmission unit further comprises:

at least one collimating lens unit configured to collimate the emitted light signal in first and second directions before the emitted light signal is reflected into the target scene.

15. The lidar system according to claim 14, wherein the at least one collimating lens unit comprises a first one-dimensional collimating lens unit and a second one-dimensional collimating lens unit, wherein the first one-dimensional collimating lens unit is disposed between the light source unit and a first scanning unit of the at least one scanning unit, and configured to collimate partial light signal of the emitted light signal in the first direction before being incident on the light source unit;

the second one-dimensional collimating lens unit is disposed between the first one-dimensional collimating lens unit and the target scene, and configured to reflect partial light signal of the emitted light signal in the second direction before being reflected to the target scene.

16. The lidar system according to claim 14, wherein the at least one collimating lens unit comprises a two-dimensional collimating lens unit, wherein the two-dimensional collimating lens unit is disposed between the light source unit and a first scanning unit of the at least one scanning unit, and configured to convert collimate partial light signal in the first direction and partial light signal in the second direction of the emitted light signal before being incident on the first scanning unit.

17. The lidar system according to claim 10, wherein the at least one photoelectric conversion unit comprises a first photoelectric conversion unit and a second photoelectric conversion unit, and the at least one optical waveguide unit comprises a first optical waveguide unit and a second optical waveguide unit;

the second optical waveguide unit and the second photoelectric conversion unit one hand and the first optical waveguide unit and the first photoelectric conversion unit one the other hand are respectively disposed in different positions orientating different directions or the same direction in the lidar system.

18. The lidar system according to claim 17, wherein the at least one light transmission unit further comprises:

a polygonal rotating mirror unit configured to rotate around a vertical axis of the polygonal rotating mirror unit, to reflect the emitted light signal reflected by an incident light receiving unit into the target scene, and/or to reflect the echo light signal returned from the target scene to the first optical waveguide unit and/or the second optical waveguide unit;

wherein the first optical waveguide unit and the second optical waveguide unit are disposed symmetrically with respect to the polygonal rotating mirror unit, or the first optical waveguide unit and the second optical waveguide unit are disposed staggered from each other relative to the polygonal rotating mirror unit.

19. The lidar system according to claim 10, wherein the at least one light transmission unit comprises a first light transmission unit and a second light transmission unit;

the first light transmission unit and the second light transmission unit receive emitted light signals from the same or different light source units.

20. The lidar system according to claim 10, wherein the at least one light transmission unit further comprises:

at least one diaphragm unit configured to intercept the light in part of the propagation direction of the echo light signal, and each diaphragm unit of the at least one diaphragm unit is disposed between the optical waveguide unit and the target scene.

\* \* \* \* \*